United States Patent
Shimazaki

Patent Number: 5,957,038
Date of Patent: Sep. 28, 1999

[54] COOKING POT WITH REVERSIBLE MULTI-FUNCTION TOP

[76] Inventor: Junji John Shimazaki, 1598 Poplar Grove Dr., Reston, Va. 20194

[21] Appl. No.: 09/006,890

[22] Filed: Jan. 14, 1998

Related U.S. Application Data

[60] Provisional application No. 60/035,570, Jan. 15, 1997.

[51] Int. Cl.[6] ............... A47J 27/00; A47J 27/06; B01D 35/02; B01D 35/28
[52] U.S. Cl. .................. 99/340; 99/403; 99/413; 99/317; 210/464; 210/465; 210/469; 220/317; 220/912; D7/667
[58] Field of Search ............... 99/339, 340, 352, 99/355, 403–418, 447–450, 482; 210/464–470, 474, 485, 499, 239, 250; 119/14.46; 126/384, 369; 220/317, 485, 630, 912; D7/667

[56] References Cited

U.S. PATENT DOCUMENTS

| | | |
|---|---|---|
| D. 347,964 | 6/1994 | Davis . |
| 1,688,846 | 10/1928 | Andrews .................................. 210/464 |
| 2,185,897 | 1/1940 | Krause et al. ......................... 99/340 X |
| 2,215,607 | 9/1940 | Eastwood ................................. 220/912 |
| 2,541,094 | 2/1951 | Pesenti ................................. 210/464 X |
| 2,667,976 | 2/1954 | Weidner .............................. 210/465 X |
| 4,025,435 | 5/1977 | Shea ................................... 210/469 X |
| 4,153,045 | 5/1979 | Phelon .................................... 126/384 |
| 4,220,534 | 9/1980 | Perry ................................... 210/469 X |
| 4,626,352 | 12/1986 | Massey et al. ......................... 99/403 X |
| 5,178,761 | 1/1993 | Mohun .................................. 99/403 X |
| 5,373,779 | 12/1994 | Grusin ................................ 210/464 X |
| 5,771,792 | 6/1998 | Chen .................................... 99/413 X |
| 5,853,581 | 12/1998 | Rayborn et al. .................... 210/469 X |

*Primary Examiner*—Timothy F. Simone

[57] ABSTRACT

The present invention relates to a cooking system having a conventional style pot with a multi-function reversible top. The system comprises two pieces, a pot and top (with a lid), that can be used individually and collectively to function as a cooking pot, colander, steamer and strainer. The pot functions by itself as a conventional cooking pot. The top functions by itself right-side-up as a colander. The pot and top with a lid functions as a steamer. And, the top, when positioned up-side-down on top of the pot, functions as a strainer. When used as a strainer, the top and pot preferably have engaging handles that allow the top and pot to be held together with one hand, to help avoid dropping food and steam burns.

20 Claims, 2 Drawing Sheets

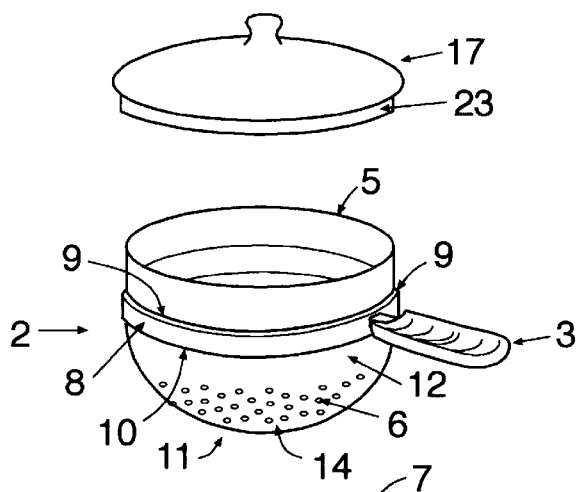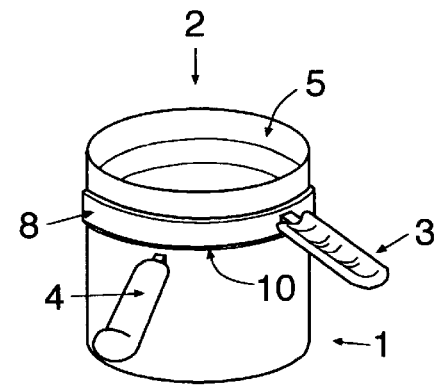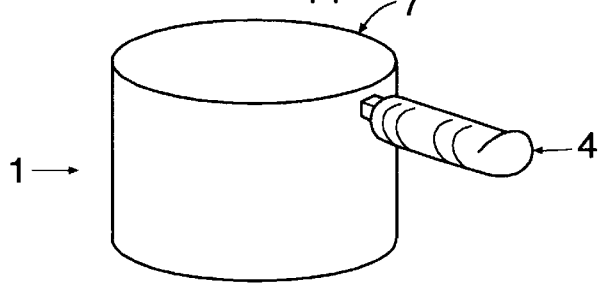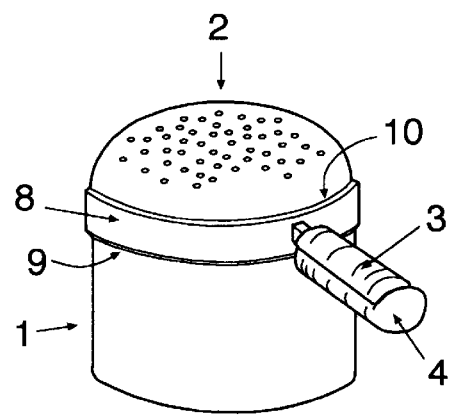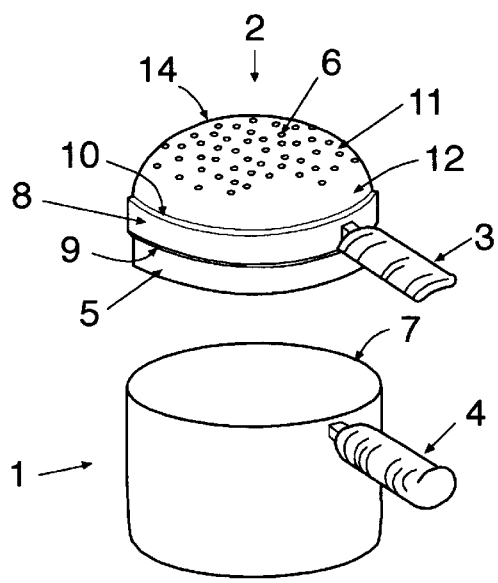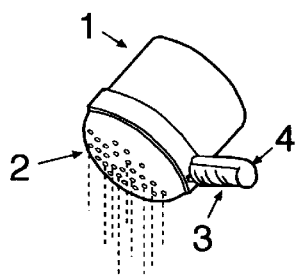
FIG. 1
FIG. 2
FIG. 3
FIG. 4
FIG. 5

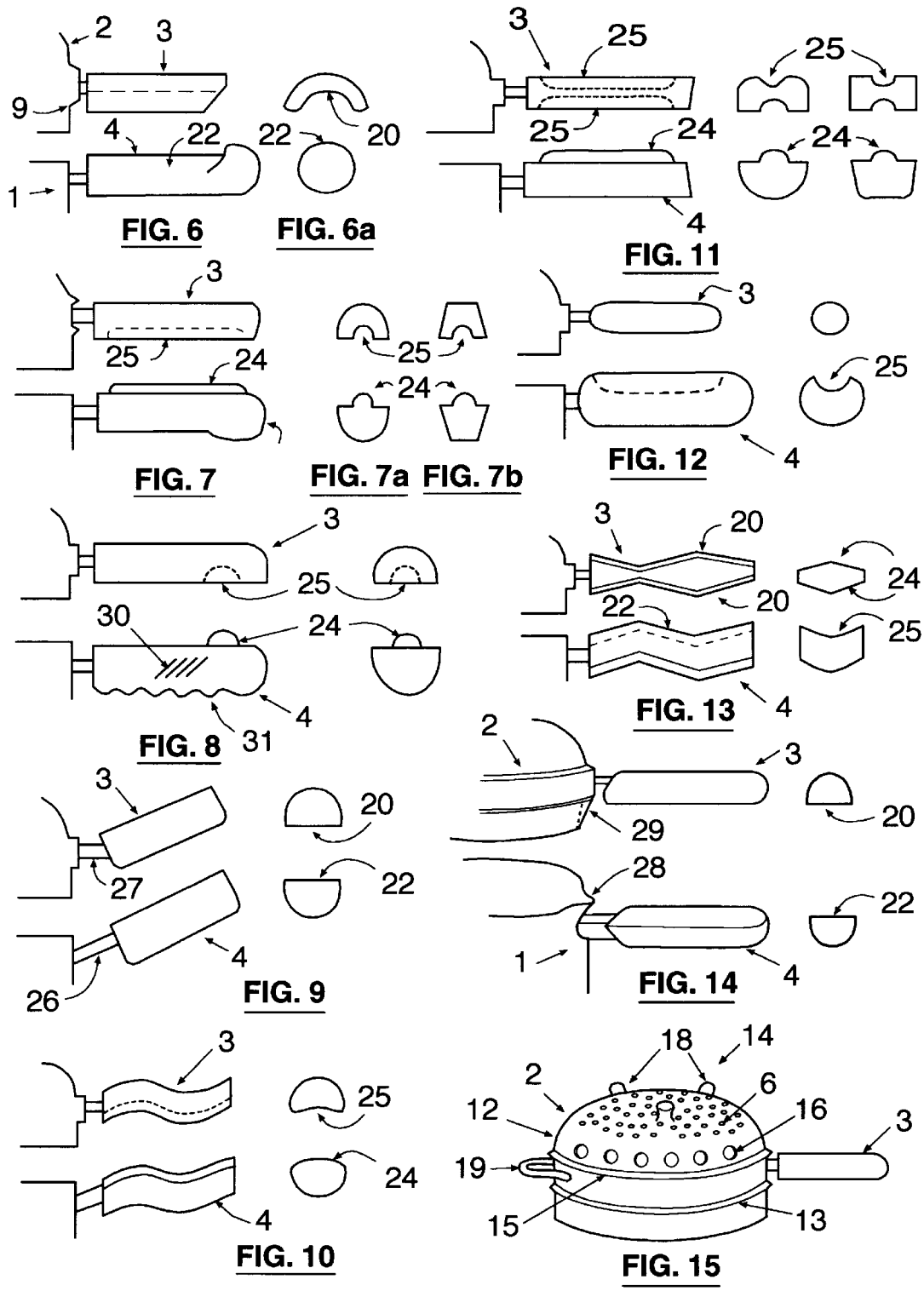

COOKING POT WITH REVERSIBLE MULTI-FUNCTION TOP

RELATED APPLICATION

The present application claims priority from U.S. Provisional Application No. 60/035,570, filed Jan. 15, 1997.

FIELD OF THE INVENTION

The present invention relates to the field of cooking systems, and in particular, to a cooking system with a reversible multi-function top.

BACKGROUND OF THE INVENTION

Many types of cooking pots are used to boil food, such as pasta, vegetables, etc. Deep pots that have sturdy handles, for example, are commonly used to cook pasta and vegetables, and in particular, long noodles such as spaghetti. Typically, when food is boiled, a strainer or colander is required to drain water. In the absence of a strainer or colander, resort is sometimes made to using a dish, or fork, or some other means, to hold food in the pot while draining water. The problem, however, is that food can easily be dropped from the pot, and steam burns are a common occurrence.

Recently, pasta cooking inserts, as they are commonly known, have become popular. Pasta cooking inserts with perforations are essentially a "pot within a pot," used to cook food, as well as drain it. Typically, food is placed into the insert which is then placed into the pot, and, after the water is boiled and the food cooked, the insert is removed, allowing water to drain through the perforations. While pasta cooking inserts can be used to drain water, they tend to be expensive and bulky. Moreover, they typically cannot be used as a strainer, i.e., to simply drain water from the pot and leave the food behind.

Vegetable steamer inserts have also become popular. A steamer insert, for example, which fits inside a larger pot, has perforations to allow steam to enter from the pot. A lid is provided that covers the pot and insert to trap the steam inside. In some cases, because they have perforations, steamer inserts are used as colanders. For example, a user may transfer food from the pot to the insert to drain the water. When the insert is used in this manner, however, the same problems exist, i.e., food can easily be dropped from the pot, and steam burns are a common occurrence. Also, like pasta cooking inserts, steamer inserts cannot be used as strainers.

To obtain all of the advantages and functions described above, many people have resorted to owning separate strainers, colanders and steamers, along with a cooking pot, which can be costly. No cooking system currently available combines all of these features in one easy to use system. There is a need, therefore, for a single cooking system that provides the functions and advantages of conventional pots, strainers, colanders and steamers, in one.

SUMMARY OF THE INVENTION

The present invention represents an improvement over previous cooking systems in that the present invention can function not only as a conventional cooking pot, but also as a strainer, colander and steamer. The present invention comprises a pot with a handle and a multi-function reversible top, with perforations, which can be positioned either right-side-up or up-side-down on the pot. When the pot is used by itself with a lid, it serves as a standard cooking pot. When the top (which has a handle) is used right-side-up by itself, it serves as a colander. When the pot and top are combined with a lid, they function together as a steamer. And, when the top is turned up-side-down on top of the pot, the top functions as a strainer, i.e., to drain water from food in the pot. For use as a strainer, both the pot and top have engaging handles that are preferably configured and oriented such that they can be brought together and mated with one another to essentially form a single combination handle, which can preferably be grasped with one hand for easy straining.

The pot of the present invention is preferably configured much like any conventional pot used for cooking having a handle, a bottom wall and side walls that are cylindrical. The pot has a rim into which the top can be fitted, either right-side-up or up-side-down. It also has a lid that can fit on both the pot and top, as will be discussed.

The top piece preferably has a dish or bowl shaped body with perforations and a handle extending from its side. The top's rim preferably has an outside diameter that is less than the inside diameter of the pot's rim to allow the top's rim to be inserted inside the pot's rim when the top is positioned up-side-down on top of the pot, i.e., for use as a strainer. The perforated portion of the body also preferably has a maximum diameter that is less than the inside diameter of the pot's rim to allow the perforated portion to be inserted inside the pot's rim when the top is positioned right-side-up on top of the pot, i.e., for use as a steamer. Adjacent to and between the rim and perforated portion of the top and extending around the perimeter is at least one raised support portion with an upper and lower ledge which allows the top to rest up-side-down or right-side-up on the pot's rim. Perforations are provided to allow water to drain or steam to pass, as the case may be, through the top. The top's handle is preferably secured to the support portion, between the upper and lower ledges, to prevent interference by the handle.

The handles on the top and pot are preferably configured and oriented so that they engage and/or otherwise mate with one another when the top is positioned up-side-down on top of the pot, i.e., used as a strainer. This enables the two handles to be grasped as a single combination handle during straining to make the present invention easy to use. Various handle configurations are possible. Preferably, one of the handles has one or more male portions, and the other handle has one or more associated female portions, to enable the handles to be brought together, engaged and held securely with one hand.

BRIEF DESCRIPTION OF THE DRAWINGS

FIG. 1 shows a perspective view of the present invention with the pot, top and lid;

FIG. 2 shows a perspective view of the top positioned right-side-up on the pot for use as a steamer or server;

FIG. 3 shows a perspective view of the top positioned up-side-down over the pot;

FIG. 4 shows a perspective view of the top positioned up-side-down on the pot with the handles engaged;

FIG. 5 shows a perspective view of the top and pot together being used as a strainer;

FIGS. 6 through 10 show side and end views of various handle configurations that can be employed in the present invention;

FIGS. 11 through 13 show side and end views of various handle configurations that can be employed where the top's handle is double sided and reversible;

FIG. 14 shows an embodiment where the top and pot can be aligned with respect to one another without engaging the handles; and FIG. 15 shows an embodiment that has two handles, varying size perforations, tripod supports for use as a colander, and separate upper and lower ledges.

DETAILED DESCRIPTION OF THE INVENTION

The present invention represents an improvement over previous cooking pots, strainers, colanders and steamers, as well as pasta cooking and steamer inserts, in that the present invention comprises a system that combines a conventional style pot 1 for cooking, with a reversible top 2, having perforations 6, wherein the top 2 and pot 1 can be used individually or in combination with each other to function as a pot, colander, steamer or strainer. The top 2 and pot 1 of the present invention also preferably have associated handles, 3 and 4, respectively, that, when properly aligned, come together, engage, and/or mate with one another, so that they can be easily held as a single combination handle, and the top 2 and pot 1 handled together with one hand if needed for easy straining.

The pot 1 of the present invention is much like any conventional pot for cooking and/or boiling foods, such as pasta, vegetables, etc. It is preferably relatively deep enough to hold water to boil food, but can otherwise be any conventional size. The pot 1 can also be made in virtually any shape, although preferably the pot is round, with a substantially flat bottom wall and cylindrical side walls, as shown in FIG. 1. In the preferred embodiment, the pot's walls are vertically oriented, having a substantially constant diameter, although side walls can vary in diameter from top to bottom if desired. Along the top edge of the pot is the rim 7, which, as will be discussed, preferably enables the top 2 to fit either right-side-up or up-side-down on top of the pot. The rim 7 can be substantially vertically oriented, or angled, or curved.

Extending from the pot 1 is handle 4, which is preferably configured and oriented to engage and/or mate with handle 3 of top 2, as will be discussed. That is, in the preferred embodiment, when the top 2 is placed up-side-down on top of the pot, as shown in FIGS. 3–4, and aligned, the two handles can be brought together and engaged and/or otherwise mated with one another, so that they can be handled jointly with one hand. As will be discussed in relation to FIGS. 6–14, the portions of the handles 3 and 4 that are brought together preferably have male and female portions that are associated with each other, although the actual shapes can be in virtually any configuration.

The lid 17 can be like any conventional lid for covering a cooking pot, although preferably it is sized so that it can cover both the pot 1 and top 2. Preferably, the lid 17 has a rim 23 that has an outside diameter that is less than the inside diameter of both the top's rim 5 and pot's rim 7, so that a single lid can be used to cover both the pot 1 and top 2.

The top 2 of the present invention, as shown in FIGS. 1–5, is adapted so that it can be placed on the pot 1, either right-side-up or up-side-down. "Right-side-up" used in reference to top 2 is in relation to its position shown in FIG. 1, and "up-side-down" is the reverse position, as shown in FIG. 3. The terms "up" and "down" and "upper" and "lower" are also used in relation to the position of the top 2 and pot 1 shown in FIG. 1, unless otherwise noted.

The top 2 is preferably substantially in the shape of a bowl, having a bowl-like body portion 11 with perforations 6, an upper rim 5 and a raised support portion 8 extending between the rim 5 and body portion 11, with a handle 3 extending therefrom. The rim 5 is preferably substantially cylindrical and extends around the perimeter of the top 2. The outside diameter of the rim 5 is preferably less than the inside diameter of the pot's rim 7 so that, when the top 2 is positioned up-side-down on top of the pot, as shown in FIGS. 3 and 4, the rim 5 fits inside the pot's rim 7. The rim 5 is preferably wide (or deep) enough so that the top 2 overlaps the pot's rim to some degree. The overlap helps reduce the amount of water and/or steam that can escape between the top's rim 5 and pot's rim 7. The width (or depth) of the rim 5 also contributes to the overall size and/or volume of the top 2.

Below the rim 5 is a radially extended upper ledge 9 which, in the preferred embodiment, forms the upper edge of the support portion 8, and, which preferably extends substantially around the perimeter of top 2. The upper ledge 9 is preferably raised radially outward in relation to the rim 5 to help support the top 2 when it is positioned up-side-down on top of the pot 1, as shown in FIGS. 3–4. On the lower edge of and below the support portion 8 is the lower ledge 10, which preferably extends around the perimeter of the top 2. Like the upper ledge, the lower ledge 10 is preferably raised radially outward in relation to the body portion 11 to help support the top 2 when the top is positioned right-side-up on top of the pot 1, as shown in FIGS. 1–2. Both the upper and lower ledges preferably extend radially outward in relation to the rim 5 and body portion 11, respectively, such that when the top 2 rests on top of the pot, either right-side-up or up-side-down, the ledges engage the pot's rim. That is, each ledge extends outward to a diameter greater than the inside diameter of the pot's rim, so that when the top rests on the pot, the ledge serves as a stop.

Extending between the upper and lower ledges is the support portion 8 which can be raised, as shown in FIGS. 1–5, or can have a different diameter, as shown in FIG. 15. The handle 3 is preferably connected to the support portion 8, between the upper ledge 9 and lower ledge 10, so that the handle 3 does not interfere with the ability of the top to be reversed. The precise location of the handle 3 on the support portion 8 preferably takes into account how far apart handle 3 would be to handle 4 of the pot when the top is positioned up-side-down on the pot. That is, because the placement of the handle can affect how far apart the handles 3 and 4 are with respect to one another, the location of handle 3 preferably takes into account the desired engagement of the handles, 3 and 4, as will be discussed, when the top is positioned up-side-down on the pot. Also, like the rim 5, the support portion 8 is part of the top's side wall, and therefore, contributes to the overall size and/or volume of the top 2.

Extending in the center of the top below the lower ledge 10 is the bowl-like body portion 11. The entire body portion 11, including the upper part 12, in the preferred embodiment, fits substantially inside the pot's rim 7, as shown in FIGS. 1–2, when the top is positioned right-side-up on the pot. The upper part 12 preferably has an outside (maximum) diameter that is slightly less than the inside diameter of the pot's rim 7, so that when the top 2 is positioned right-side-up on top of the pot, as shown in FIG. 2, the body portion 11 fits snug in the pot. In the preferred embodiment, the upper area 12 is curved downward and inward, as shown in FIG. 1, beginning from the lower ledge 10, becoming smaller in diameter toward the center area 14.

Perforations 6 are located on the body portion 11, including the center area 14 and/or upper area 12, to allow water to drain or steam to pass. The perforations 6 can be any conventional size, but preferably small enough to help keep foods, such as small vegetables and thin pastas, from passing through. The perforations 6 are also preferably round in shape, although other shapes are possible without departing from the scope of the present invention. Indeed, different shapes, such as stars or crosses, can be used which allow more water to pass through, while at the same time, helping to retain small food items.

Each of the perforations 6 are preferably substantially the same size, although perforations of varying sizes can be used. For example, as shown in the embodiment of FIG. 15, relatively large perforations 16 can be placed along the upper area 12 to help facilitate water drainage, while relatively small perforations can be placed along the bottom area 14 (which is shown in FIG. 15 as the top). It is not desirable, however, to place any perforations on the rim 5, support portion 8, and/or anywhere on or between the upper and lower ledges 9 and 10. This is so that steam will not be allowed to escape through the perforations, as will be discussed, when the top is used right-side-up as a steamer.

Secured to the outside of the bottom area 14, in some embodiments, as shown in FIG. 15, are downwardly extending support members 18, which allow the top 2 to stand on its own. When support members are provided, there are preferably at least three support members 18, which extend relatively downward. These support members can be made in any configuration, including round, flat, angular, pointed, etc.

The top's handle 3, as discussed, extends from or is otherwise connected to the support portion 8 of the top 2 substantially between the upper ledge 9 and lower ledge 10 to avoid interference with other functions of the top. In the preferred embodiment, the handle 3 is secured to the support portion 8 so that it extends substantially outward, to a level that is near or above the level of the upper ledge 9, as will be discussed. The handle 3 allows the user to hold the top 2 with one hand, and can have hand grips 31, or textures 30, as shown in FIG. 8.

The following discussion, in reference to FIGS. 6–14, contains descriptions of some of the preferred handle shapes. It should be understood, however, that virtually any handle shape and/or orientation that performs in the intended manner can be used. The "up" and "down" directions used in relation to the description of the handles in the following discussion are used in reference to the position of the pot 1 and top 2 shown in FIGS. 6–14, that is, with top 2 up-side-down.

FIG. 6 shows an embodiment in which the handles 3 and 4 have mating surfaces 20, 22 that overlap one another to some extent. In this embodiment, the handle 4 of the pot is preferably substantially round in cross section, as shown in FIG. 6a, like many conventional handles for easy handling. The handle 3 of the top is, on the other hand, curved and shaped like a half-pipe so that it substantially fits on top of and mates with the rounded handle 4. As shown in FIG. 6a, the shape of the female mating surface 20 of handle 3 is substantially the same, although in the opposite or inverted position, as the shape of the male mating surface 22 on handle 4. Also, as with all of the embodiments, only the mating surfaces are required to be substantially identical and/or inverted in shape. The shape of the remainder of the handle can vary.

In the embodiment of FIG. 6, both handles are substantially horizontally oriented so that the mating surfaces 20, 22 are horizontally oriented with respect to each other. Each of the handles are connected to their respective members, pot 1 and top 2, as shown, to enable them to engage one another when the top is positioned on the pot up-side-down. That is, the mating surface 20 of handle 3 preferably extends relatively down below the level of the upper ledge 9, and the mating surface 22 of handle 4 preferably extends relatively up above the level of the pot's rim 7, so that the two mating surfaces can engage one another when the top is positioned on the pot. It should be noted, however, that if one of the handles is extended further up, or down, to a greater amount than the other, the other handle is adjusted accordingly so that they engage one another. It should also be noted that the handles can be reversed, such that handle 3 is round, and handle 4 is in the shape of a half-pipe, if desired.

In addition, in this embodiment, while both of the handles can be made the same length, one of them is preferably made longer than the other. For example, when the handle 4 is made longer than handle 3, the end of handle 3 conforms to the shape of handle 4, as shown in FIG. 6. In this manner, when the two handles are brought together, they form a single handle unit, as shown in FIG. 4. Moreover, when handle 4 is used separately, the larger end improves the users grip and prevents slippage. The extended portion also allows the two handles to be easily separated when needed. In this respect, it should be noted that a hole large enough for a finger to pass through can be placed on the half-pipe shaped handle, so that the user can push the other handle away when needed to separate the handles easily. One or more holes can also be placed at the end of the handles, or hanging loops or clips provided, for easy hanging and storage.

In FIGS. 7–8, the handles 3, 4 are substantially configured with a male insert portion 24, provided on one handle, and an associated female receiving portion 25, provided on the other handle, to allow the handles to engage and mate with one another. Although the drawings show the male insert portion 24 on handle 4, and the female portion 25 on handle 3, the male and female portions can be reversed without departing from the present invention. In either case, the male insert portion is configured and arranged so that it mates with the female counterpart portion 25 when the handles are brought together.

The male and female portions can be in virtually any configuration that will allow them to come together, including rounded shapes, as shown in FIG. 7a, oval, angled and polygon shapes, etc. They can also be oriented in virtually any direction. In the preferred embodiments, the mating portions 20, 22 are configured to come together when the top 2 and pot 1 are brought together substantially vertically with respect to each other, while in other embodiments, they can be configured so that they come together in other directions, such as side to side. For easy engagement between the two handles, the male insert portion 24 is preferably slightly smaller than the similarly shaped female receiving portion 25. The remaining portions of the handles can have virtually any configuration, as well as hand grips 31, protrusions, indentations, textures 30, patterns, curvatures, or other variations, to help the user hold the handles easily.

The male 24 and female 25 portions can extend longitudinally along the length of the handle, as substantially shown in FIG. 7, or can be relatively short and/or rounded, such as shown in FIG. 8. The male and female portions can also extend laterally, or across the handles, if desired, or in any direction that will work in the intended manner. More than one male/female portion can also be provided, if desired, such as a pattern of opposing male/female portions. The handles that come together are also preferably configured substantially horizontally, as shown in FIG. 7, although not necessarily so, as will be discussed. The mating surfaces that come into contact, other than the male/female portions, are preferably substantially reciprocally oriented, so that the handles can be brought together to form a single handle unit that can be grasped with one hand.

FIG. 9 shows an embodiment where the handles 3 and 4 are angled in a manner that will allow them to be engaged when the top is positioned up-side-down on top of the pot, i.e., used as a strainer, while not allow them to be engaged when the top is positioned right-side-up on the pot, i.e., used as a steamer. That is, when the top 2 is positioned right-side-up on the pot, the handle 3 will be angled downward, while the handle 4 of the pot will be angled upward. On the other hand, when the top is positioned up-side-down on the pot, the angle of the handle 3 is preferably substantially the same as the angle of handle 4, such that the two handles can be brought together and engaged with one another. FIG. 9 also shows the mating surfaces 20, 22 to be substantially flat or planar. Nevertheless, male and female portions 24 and 25, and other mating surfaces, can be used in combination with the angled handles as well.

FIG. 10 shows an embodiment where the handles are curved and angled. Both the angle and curvature of the mating surfaces of the handles 3, 4 are substantially reciprocal, as discussed above, so that when they are brought together with the top up-side-down on the pot, the handles form a single handle unit that can be grasped with one hand. This embodiment has mating surfaces which are curved longitudinally and laterally to help the handles become self-aligned when they are brought together.

While the handles in any of the embodiments can be configured with relatively flat or planer mating surfaces 20, 22 that merely overlay one another, like those shown in FIG. 9, which allows both handles to be grasped when desired, it is desirable that there be at least some degree of mating between the mating surfaces 20, 22, and/or male and female portions 24 and 25, so that the two handles cooperate with each other, and are capable of becoming self-aligned and/or self-centered with respect to one another when they are brought together. The remainder of handle 3, including the support shaft, can otherwise be angled and/or configured separately, as shown in FIGS. 9–10.

The embodiments of FIGS. 11–13 are designed so that the top 2 can be positioned either right-side-up or up-side-down on top of the pot 1, and in either case, the two handles 3, 4 can be brought together and engaged and/or mated with one another, not only in the up-side-down position, i.e., as a strainer, as in the previous embodiments, but also in the right-side-up position, i.e., as a steamer. In this manner, the top 2 and pot 1 can be brought together and grasped using the two handles as a single combination handle whether the top is right-side-up or up-side-down, i.e., used as a steamer or strainer. In these embodiments, it is important that the handle 3 have substantially the same shape on the upper and lower sides, and be positioned substantially in the center of the support portion 8, in between the upper and lower ledges 9 and 10, so that, whether the handle 3 is right-side-up or up-side down, the handle 3 engages handle 4 in substantially the same manner. The width (height) of the support portion 8 between the upper and lower ledges is, accordingly, in this embodiment, a function of the size and shape of the handles, which preferably allows them to engage one another. With handles that are relatively large and/or angled, the width (height) of the support portion 8 can be relatively great. With handles that are relatively small, on the other hand, and/or substantially horizontally oriented, the support portion 8 is correspondingly smaller.

FIG. 11 shows an embodiment where the male portion 24 is on handle 4, and similarly shaped but inverted female portions 25 are on handle 3, on the upper and lower sides. The handle 3 is provided with substantially identical female portions 25 on the upper and lower sides, so that whether the handle 3 is up-side-down or right-side-up, the two handles mate. The handles and/or mating surfaces otherwise can, as discussed previously, be in virtually any configuration. FIG. 12 shows an embodiment where the handle 3 of the top 2 is rounded, and can fit into the female portion 25 of handle 4, either right-side-up or up-side-down. In this embodiment, the handle 4 is preferably slightly longer, although not necessarily so, than handle 3, so that the entire length of handle 3 can fit within the female portion 25.

FIG. 13 shows an embodiment where the handles are designed so that they mate both longitudinally and laterally, i.e., the angles and/or curvatures of the handles, both longitudinally and laterally, are designed to come together and capable of becoming self-aligned and/or self-centered. That is, as shown in FIG. 13, the mating surfaces are configured to come together along the length and width of the handles, wherein the mating surface 22 of handle 4 is substantially identical, although inverted, in shape, both longitudinally and laterally, to the mating surfaces 20 on both the upper and lower surfaces of handle 3. They also have male and female portions 24, 25 as shown. The handle 3 is also substantially symmetrical in cross section, so that in either direction, the mating surfaces 20 are substantially identical, although inverted, in relation to the mating surface 22 of handle 4.

The embodiment of FIG. 14 shows handles having relatively flat or planar engagement surfaces which merely overlap one another rather than mate. In this embodiment, the shape of the pot 1 and top 2 can be adapted to allow them to mate with one another, to help self-align the top 2 with the pot 1, and to position the handles properly. The alignment of the pot and top can be provided, as shown, by mating protrusions 28, or indentations 29, which form male and female counterparts. This same feature can also be provided by simply making the pot and top member oval or otherwise not round in configuration, so that they are self-aligned when one is fitted on top of the other.

It should be clearly understood that virtually any handle design that performs in the intended manner can be used. What is required is that the handles 3, 4 be oriented so that they engage one another in some manner to allow the pot and top to be handled together as a single unit, particularly when the top is positioned up-side-down on top of the pot and used as a strainer, as shown in FIG. 5. This means that virtually any shape of handles can be used to perform in the intended manner.

FIG. 15 shows an alternate embodiment wherein the top member has perforations 16 which are larger on the upper area 12, than the perforations 6 located on the bottom area 14. It also has three support members 18, as discussed previously, so that it can stand on its own. It also has an extra handle 19, extending from the support portion 8, which can be used to hold the top. The pot 1 can also have an extra handle if desired. This embodiment also shows the upper and lower ledges 13 and 15 to be separate radially extending portions, rather than being part of a single support portion 8. In such case, the support portion 8 can have a diameter that is substantially the same as the rim portion 5 and upper area 12.

The present invention can be manufactured like any conventional style cooking pot, strainer, colander and steamer. The pot, top and lid can be made of any strong, rigid, heat resistant material such as metal, steel, aluminum, etc., and preferably is coated with a finish such as stainless steel. Any of many conventional non-stick materials can also be used if desired. The support shaft of the handles 3, 4 can be made of the same or similar material and integrally extended from or otherwise connected in any conventional manner to the pot and top, respectively. The hand grip portion of the handles, as well as the mating portions, can be made of a separate material, such as one that is lower in heat conduction, and higher in friction coefficient, for better grip. Materials such as plastics, rubber-base materials, carbon graphite, wood, foam, etc., and virtually any material that performs in the intended manner, can be used. The handles are preferably molded or otherwise shaped so that the proper shapes can be formed efficiently.

The top 2 can be used in several ways. For example, to use top 2 as a strainer, i.e., to drain water from the food after it is cooked in the pot, it can be reversed up-side-down and positioned on top of the pot after the food is cooked, and, by turning the pot 1 sideways, or up-side-down, together with top 2, using the handles 3, 4, water can be drained from the pot while keeping the food inside. That is, when the food inside the pot is cooked, the pot with the top on top of it, can be turned as a single unit, grasping the mated handles jointly, like a single handle, with one hand. This enables water to be drained from the pot through the perforated top simply by turning the unit sideways or up-side-down. In this manner, the user can avoid having to hold the top separately with his/her hands, or having someone else hold it, which in ordinary circumstances can cause hot steam to rise and possibly cause injury.

For use as a strainer, the top is placed on top of the pot, up-side-down, i.e., with the open end facing down. The rim 5 is slid and inserted into the pot's rim 7 until the radially extended upper ledge 9 of the support portion 8 rests on top of the pot's rim 7. With the top on the pot in this manner, the top 2 can be aligned so that it's handle 3 is positioned substantially over the pot's handle 4. In this manner, the two handles can be brought together and engaged to form a single handle unit which can be grasped and held together, preferably with one hand. This allows the user to hold the pot and top together when turning the pot to drain water from the pot. While water passes through the perforations, food remains in the pot. Also, only a small amount of steam is allowed to pass, helping to reduce steam burns.

For use as a steamer, water is placed in the pot, and then the top can be placed on the pot right-side-up, wherein food is placed in the top, and then lid 17 is placed on the top's rim to trap steam. With the pot and top stacked in this manner, the water is boiled to cause steam to pass through the perforations and into the top to steam cook the food inside. The top is preferably shallow enough so that it avoids the boiling water in the pot, i.e., when water is placed in the pot, the top does not touch the water, so that, under normal circumstances, water remains below the bottom of the top, allowing only steam to pass through the perforations and into contact with the food. The same lid 17 used to cover the pot 1 can be used to cover the top 2 to trap steam inside the pot.

For use as a colander, the top is used by itself right-side-up in a conventional manner, i.e., food can be transferred into the top to drain excess water. Also, once the food is transferred, the top can be placed back on top of the pot, to allow more water to be drained, and for serving purposes. The top can also be used like any ordinary colander to drain water from any non-cooked food items, such as lettuce, spinach, salads, vegetables, etc.

For use as a pot, the pot and lid can be used in the conventional manner.

What is claimed is:

1. A cooking system, comprising:
   a pot having at least one handle extending therefrom, said pot having a rim with a predetermined inside diameter;
   a reversible top member having at least one handle extending therefrom, said top member comprising:
   a rim with a predetermined outside diameter that is less than the inside diameter of said pot's rim, wherein when the top member is positioned on top of the pot in a first direction, said top member's rim can be positioned inside said pot's rim;
   a perforated body portion having a maximum diameter that is less than the inside diameter of said pot's rim, wherein when the top member is positioned on top of the pot in a second direction, said body portion can be positioned inside said pot's rim; and
   an annular portion extending substantially between said top member's rim and body portion, said annular portion having first and second ledge portions, wherein each of said ledge portions has a predetermined diameter greater than the inside diameter of said pot's rim, wherein when said top member is positioned on said pot in said first direction, said top member rests with said first ledge on said pot's rim, and wherein when said top member is positioned on said pot in said second direction, said top member rests with said second ledge on said pot's rim.

2. The system of claim 1, wherein the top member's handle extends substantially outward from said annular portion between said first and second ledges.

3. The system of claim 2, wherein said pot's handle is adapted to substantially engage said top member's handle when said top member is positioned on said pot in said first direction.

4. The system of claim 3, wherein said pot's handle has at least one male portion and said top member's handle has at least one female portion, wherein said male portion is adapted to mate with said female portion when said top member is positioned on said pot in said first direction.

5. The system of claim 4, wherein said male portion extends substantially longitudinally along the length of said pot's handle, and said female portion extends substantially longitudinally along the length of said top member's handle.

6. The system of claim 4, wherein said male portion comprises at least one protruding member, and said female portion comprises at least one recess into which said protruding member can be inserted.

7. The system of claim 4, wherein said male portion has a convex curvature and said female portion has a concave curvature.

8. The system of claim 3, wherein said pot's handle has at least one female portion and said top member's handle has at least one male portion, wherein said male portion is adapted to mate with said female portion when said top member is positioned on said pot in said first direction.

9. The system of claim 8, wherein said female portion extends substantially longitudinally along the length of said pot's handle, and said male portion extends substantially longitudinally along the length of said top member's handle.

10. The system of claim 8, wherein said male portion comprises at least one protruding member, and said female portion comprises at least one recess into which said protruding member can be inserted.

11. The system of claim 8, wherein said male portion has a convex curvature and said female portion has a concave curvature.

12. The system of claim 3, wherein said pot's handle has at least one male portion, and said top member's handle has at least one upper female portion and one lower female portion, wherein said male portion is adapted to mate with said one upper female portion when said top member is positioned on said pot in said first direction, and said male portion is adapted to mate with said one lower female portion when said top member is positioned on said pot in said second direction.

13. The system of claim 3, wherein said pot's handle has at least one female portion, and said top member's handle has at least one upper male portion and one lower male portion, wherein said female portion is adapted to mate with said one upper male portion when said top member is positioned on said pot in said first direction, and said female portion is adapted to mate with said one lower male portion when said top member is positioned on said pot in said second direction.

14. The system of claim 1, wherein the system comprises a lid with a rim having a predetermined outside diameter that is less than the inside diameter of said top member's rim, and less than the inside diameter of said pot's rim.

15. The system of claim 1, wherein said pot's rim has a portion that mates with a portion on said top member's rim.

16. A cooking system, comprising:
   a pot having at least one handle extending therefrom, said pot having an upper rim portion;
   a reversible top having at least one handle extending therefrom, said reversible top comprising:
      a rim portion that fits within said pot's rim portion when said top is positioned on said pot in a first position;
      a perforated body portion having an outer dimension that fits within said pot's rim portion when said top is positioned on said pot in a second position, wherein said second position is opposite said first position; and
      an intermediate portion extending between said top's rim portion and said body portion having first and second ledge portions extending outwardly therefrom, wherein in said first position, said top rests on said pot with said first ledge portion on said pot's rim portion, and wherein in said second position, said top rests on said pot with said second ledge portion on said pot's rim portion.

17. The system of claim 16, wherein said one handle of said top extends outwardly from said intermediate portion between said first and second ledge portions, and wherein said one handle of said pot and said one handle of said top are adapted such that they are capable of engaging one another when said top is positioned on said pot in said first position.

18. The system of claim 16, wherein said one handle of said top extends outwardly from said intermediate portion between said first and second ledge portions, and wherein said one handle of said pot and said one handle of said top are adapted such that they are capable of engaging one another when said top is positioned on said pot in either said first position or said second position.

19. The system of claim 16, wherein said system comprises a lid with a rim portion that is adapted to fit within said top's rim portion and said pot's rim portion.

20. A cooking system, comprising:
   a pot having at least one handle extending therefrom, said pot having an upper rim portion;
   a reversible top member having at least one handle extending therefrom, said top member comprising:
      a rim portion adapted to fit within said pot's rim portion when said top member is positioned on said pot in a first direction;
      a perforated body portion adapted to fit within said pot's rim portion when said top member Is positioned on said pot in a second direction, wherein said first direction is opposite said second direction; and
      an intermediate portion extending between said top member's rim portion and said body portion with said one handle of said top member extending outwardly from said intermediate portion, wherein said one handle of said top member and said one handle of said pot are adapted such that they are capable of engaging one another when said top member is positioned on said pot in said first direction.

* * * * *